United States Patent [19]
Wainwright

[11] Patent Number: 5,525,879
[45] Date of Patent: Jun. 11, 1996

[54] INTERMITTENT WINDSHIELD WIPER

[75] Inventor: Richard E. Wainwright, Waynesville, Ohio

[73] Assignee: ITT Automotive Electrical Systems, Inc., Auburn Hills, Mich.

[21] Appl. No.: 316,528

[22] Filed: Sep. 30, 1994

[51] Int. Cl.⁶ .................................................. B60S 1/08
[52] U.S. Cl. ....................... 318/443; 318/444; 318/445; 318/DIG. 2; 15/250.13
[58] Field of Search ................................. 318/440–490, 318/DIG. 2; 15/250 C, 250.17, 250.12, 250.13

[56] References Cited

U.S. PATENT DOCUMENTS

| | | | |
|---|---|---|---|
| 4,578,591 | 3/1986 | Floyd et al. | 307/10 R |
| 4,663,575 | 5/1987 | Juzswik et al. | 318/444 |
| 4,689,535 | 8/1987 | Tsunoda et al. | 318/443 |
| 4,825,134 | 4/1989 | Tracht | 318/443 |
| 4,851,745 | 7/1989 | Ponziani | 318/443 |
| 5,117,168 | 5/1992 | Nomura et al. | 318/444 |
| 5,166,587 | 11/1992 | Smart | 318/444 |
| 5,200,676 | 8/1993 | Mueller et al. | 318/444 |
| 5,216,341 | 6/1993 | Nomura et al. | 318/444 |
| 5,245,259 | 9/1993 | Nakamura et al. | 318/443 |
| 5,254,916 | 10/1993 | Hopkins | 318/443 |
| 5,256,950 | 10/1993 | Matsumoto et al. | 318/443 |
| 5,355,061 | 10/1994 | Forhan | 318/443 |

*Primary Examiner*—Paul Ip
*Attorney, Agent, or Firm*—Jacox Meckstroth & Jenkins

[57] ABSTRACT

A method and apparatus for finely adjusting the dwell period for an intermittent windshield wiper. A multi-position switch establishes a maximum delay and a delay request. A processor reads the switch setting and senses the timing of a positioning movement relative to the timing of the next preceding wiper blade stroke. When the elapsed time between those events is intermediate the maximum delay and the delay request, the dwell period is set equal to the elapsed time. Otherwise the dwell period is set equal to the maximum delay.

4 Claims, 5 Drawing Sheets

INTERMITTENT WINDSHIELD WIPER

BACKGROUND OF THE INVENTION

This invention relates to vehicle windshield wipers having a finely tuneable intermittent operating mode. More particularly the invention relates to an apparatus and method for improving the ability of an operator of a vehicle to set the amount of the dwell (pause) in an intermittent wiper system to a precisely desired time.

Contemporary intermittent windshield wipers set dwell times through the use of one or more switches and either a continuously variable resistor (potentiometer) or discretely selected resistors, arranged in an RC (resistor-capacitor) timing circuit. A major problem with the potentiometer arrangement is that an instant wipe cannot be obtained except by decreasing the circuit resistance at a time near the end of a dwell. Another disadvantage of the potentiometer type of wiper control is its non-linear operation. This makes it difficult to fine tune the dwell time, especially for shorter durations.

The discretely selected resistor switch (typically 5 to 7 detented positions) overcomes both of these disadvantages by using resistors of exactly known resistance for each time setting and arranging them between discrete contacts points. The problem with that arrangement is that relatively few distinct settings are available. This severely limits the ability of the system to satisfy operator preferences.

Wiper control systems which rely upon RC time constants for timing control are susceptible to timing errors caused by component tolerances, variations in triggering thresholds, and temperature induced resistance changes. Another problem is that very large resistance values are necessary in order to accommodate long dwell times (greater than about 10 seconds). A general teaching of intermittent wiping control based upon RC time constants may be found in Tracht U.S. Pat. No. 4,825,134 and references mentioned therein.

Graham U.S. Pat. No. 4,492,904 discloses a technique for overcoming some of the problems of RC timing circuits. Graham teaches a "one touch" wiper having a single switch for setting an intermittent wiping dwell time. When the switch is depressed an instant wipe is obtained and a digital timing circuit begins to run. If the switch is not depressed again, the timer times out, and the system self sets the dwell time to a predetermined maximum duration of approximately twenty seconds. If the switch is depressed a second time before the time out, the timer value is stored as a desired dwell time.

A problem with single-switch dwell period adjustment is that the technique is quite foreign to the average driver. Drivers of vehicles equipped with such wiping control systems have had difficulty acclimating themselves to the procedure. As, a consequence, systems of this type have been plagued by operator-induced problems which erroneously have been attributed to equipment malfunction. Studies have shown that drivers prefer to adjust their wiper dwell periods by more familiar methods such as rotating a column switch or linearly sliding a friction switch to a selected one of a series of positions.

SUMMARY OF THE INVENTION

This invention provides a windshield wiping apparatus and method utilizing a digital timing circuit which is implemented in such a way as to enable an operator to make finely tuneable dwell period adjustments through a procedure closely akin to familiar resistance switch setting. Discrete switch settings are provided, and different dwell periods are associated with each switch position.

When the operator adjusts the switch in a direction for increasing the dwell period, the length of the selected dwell is absolutely controlled by the new switch setting. The dwell value is updated immediately, and an instant wipe is not performed. When the operator moves the switch in the reverse direction, an elapsed time counter signals an indication of the elapsed time since the last wiping stroke. The system then provides an instant wipe and sets the dwell period at a duration corresponding to the indicated elapsed time.

In a preferred embodiment the invention uses a windowing technique for tracking switch movement during a dwell-decreasing adjustment. When the switch setting is decreased the new switch position is used to establish a delay request. The system then establishes a maximum delay corresponding to the next higher switch position. If the elapsed time since the last wiper stroke is shorter than the maximum delay and longer than the delay request, then the dwell period is set equal to the elapsed time. If the elapsed time is shorter than the delay request, then the dwell period is set equal to the request. Otherwise the dwell period is set equal to the maximum delay.

DESCRIPTION OF THE PREFERRED EMBODIMENT

Figure 1:
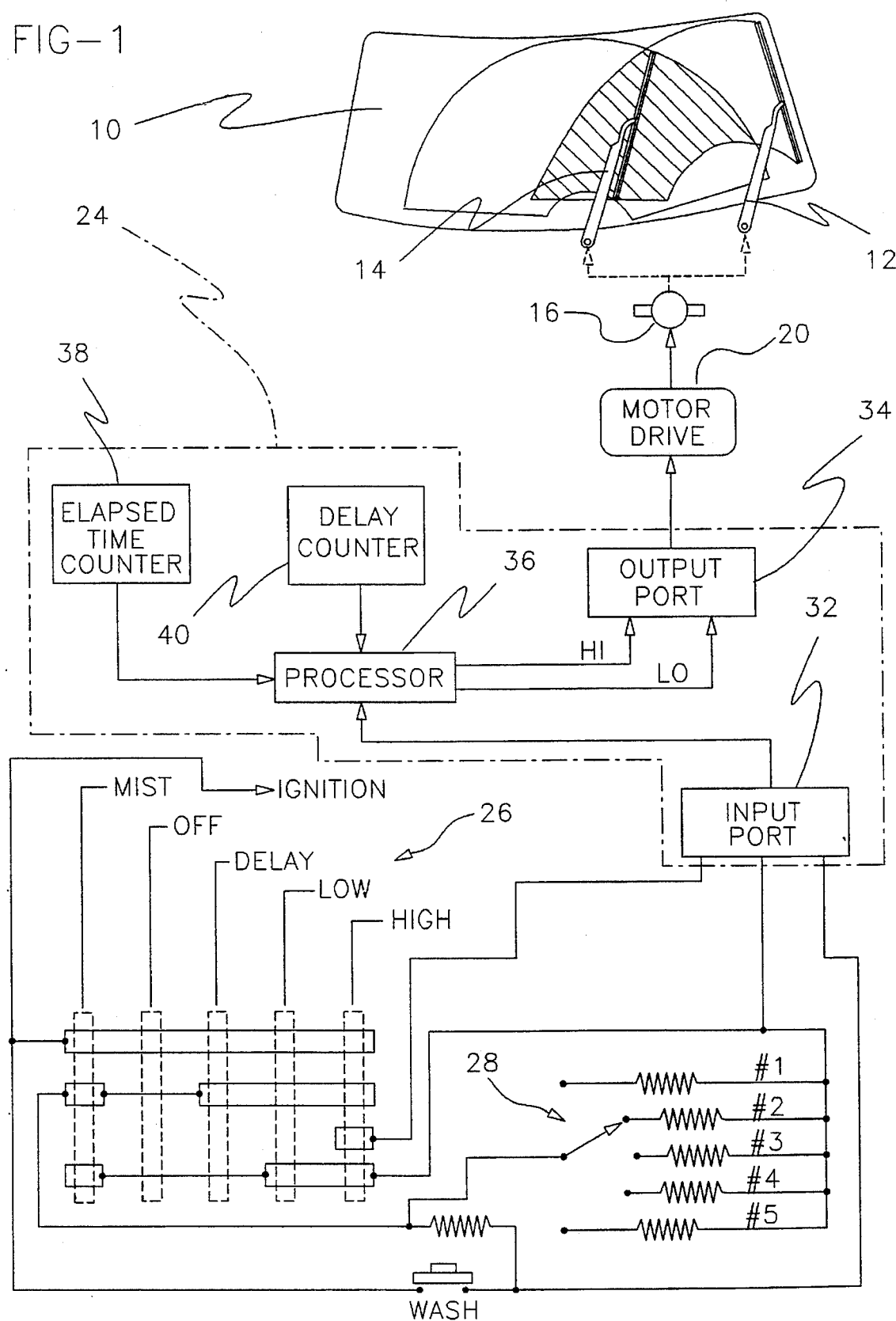
FIG. 1 is a schematic block diagram of an intermittent windshield wiper under dwell period control according to the present invention.

FIG. 1 illustrates a windshield 10 being wiped by a pair of wipers 12, 14 driven by a motor 16 powered by a motor drive unit 20. Motor 16 is a dual speed brushless motor and is activated by a controller 24 shown in phantom lines. Controller 24 functions in response to switching signals generated by a pair of switches 26,28 and received at an input port 32. The controller transmits actuation commands to drive unit 20 via an output port 34. While a variety of switch arrangements are contemplated, a five-position sliding switch (26) and a five-position rotary switch (28) are shown for purposes of illustration. Also, the invention could be practiced on a system having a single speed motor or dual motors.

Switch 28 has five manually selectable switching positions indicated by the legends #1–#5. These switching positions produce electrical connections through discrete resistors of different value and enable an operator to select any one of five predetermined wiper dwell periods. Switch 26 is conventional and may provide switching selections such as MIST, OFF, DELAY, LOW and HIGH, all as illustrated in FIG. 1. A separate pushbutton WASH switch may also be provided, if desired.

Switching signals provided to controller 24 via input port 32 are processed by a processor 36. Processor 36 includes a clock (not illustrated) which generates timing interrupt signals. These timing interrupt signals are used for incrementing a count in an elapsed time counter 38 and decrementing a count in a delay counter 40. While elapsed time counter 38 and delay counter 40 are illustrated as being separate devices, they may be implemented by registers forming part of processor 36.

In order to use the invention the operator selects the DELAY position for switch 26. Then switch 28 is set to one of five illustrated positions #1–#5. Switch 28 generates an analog voltage corresponding to the switch setting. Processor 36 includes an A/D converter (not illustrated) which converts the analog voltage to a digital value. Processor 36 then reads the setting of switch 28 and sets the count in delay counter 40 to an associated one of five predetermined values. This establishes the initial dwell period for intermittent wiping. During the dwell period counter 40 counts downwardly from the set value. Meanwhile, counter 38 counts upwardly from zero. The dwell terminates, and a new stroke commences when counter 40 zeroes out. Counters 38, 40 are then reset.

If the operator decreases the setting of switch 28 during intermittent wiping, then processor 36 checks the count in the elapsed time counter 38 to determine the time at which the switching change occurred. If this elapsed time is greater than the time indicated by the new switch position and less than the time corresponding to the next higher switch position, then an instant wipe is commanded, and the elapsed time is used for resetting the count in delay counter 40.

FIGS. 2A–2D present a flow chart for the operations performed by processor 36 in connection with the setting of the dwell period. It will be appreciated that processor 36 may perform other operations (not illustrated) related to the control of functions such as wash water pumping, wiper blade position sensing and automatic response to a rain sensor. The operations illustrated in FIGS. 2A–2D represent a subroutine which is executed periodically whenever switch 26 is in the DELAY position. Entry into the subroutine is indicated by the "START" bubble 50 of FIG. 2A.

Immediately upon entry into the subroutine processor 36 begins checking the position of switch 28. Sequential checks are performed on the status of input lines connected to each of the five switch positions. As illustrated at branch point 52, the first check may be an inquiry to determine whether switch 28 is placed at position #5. This would indicate an operator request for a dwell period associated with that particular switch position. For example, position #5 may indicate a request for a dwell period in the order of about twenty seconds.

If switch 28 is determined to be set at position #5, then processor 36 performs a check to assure itself that switch 28 is securely set at that position and is not in motion. This is done by repeatedly looping through the subroutine and saving the switch position reading. If processor 36 reads the same switch position two times in succession, then it concludes that switch 28 is not in motion. Thus at branch point 54 processor 36 checks for a second consecutive occurrence of switch position #5.

Figure 2A:
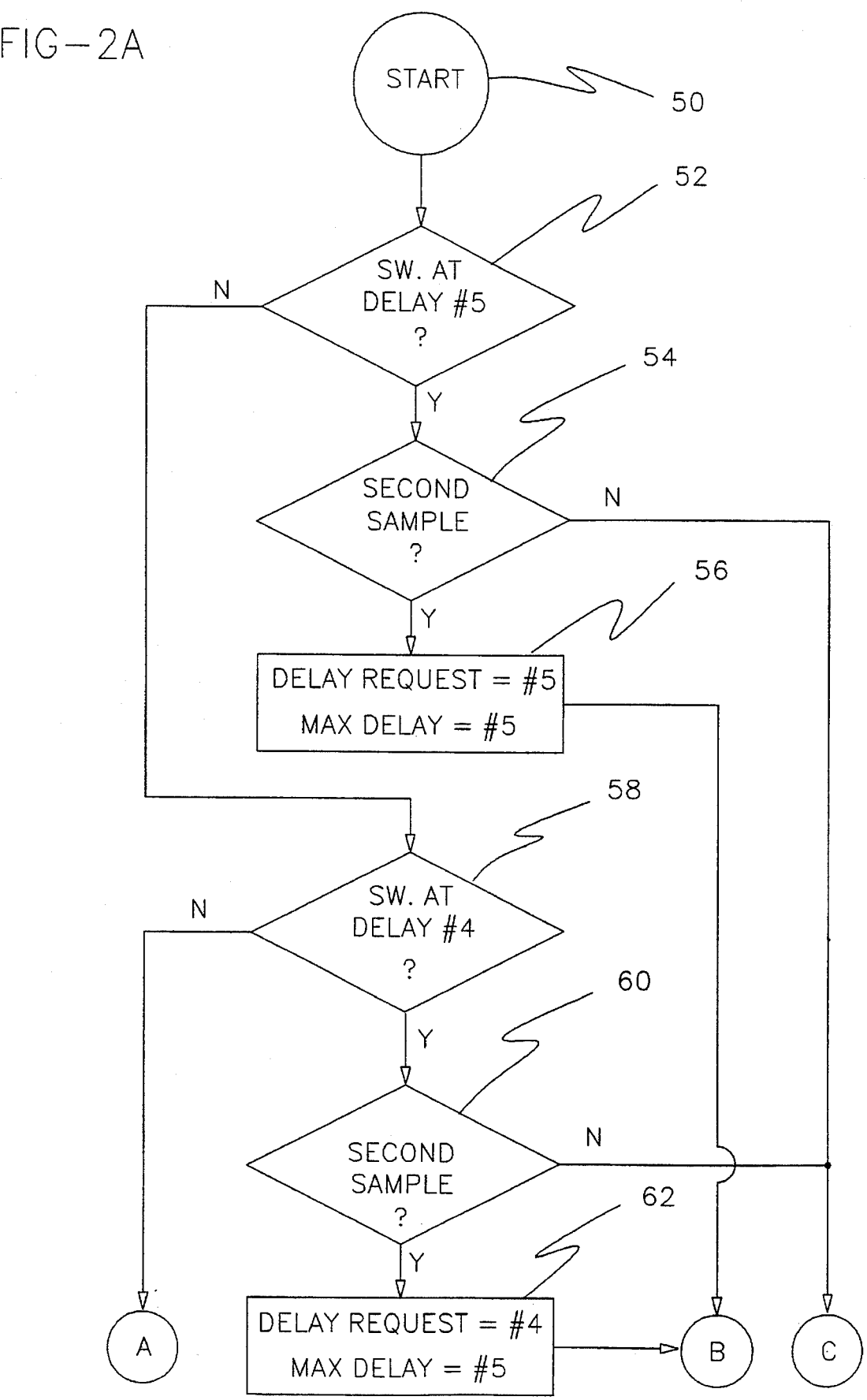
FIGS. 2A–2D are a flow chart illustrating the method of operation of the intermittent windshield wiper.
Figure 2B:
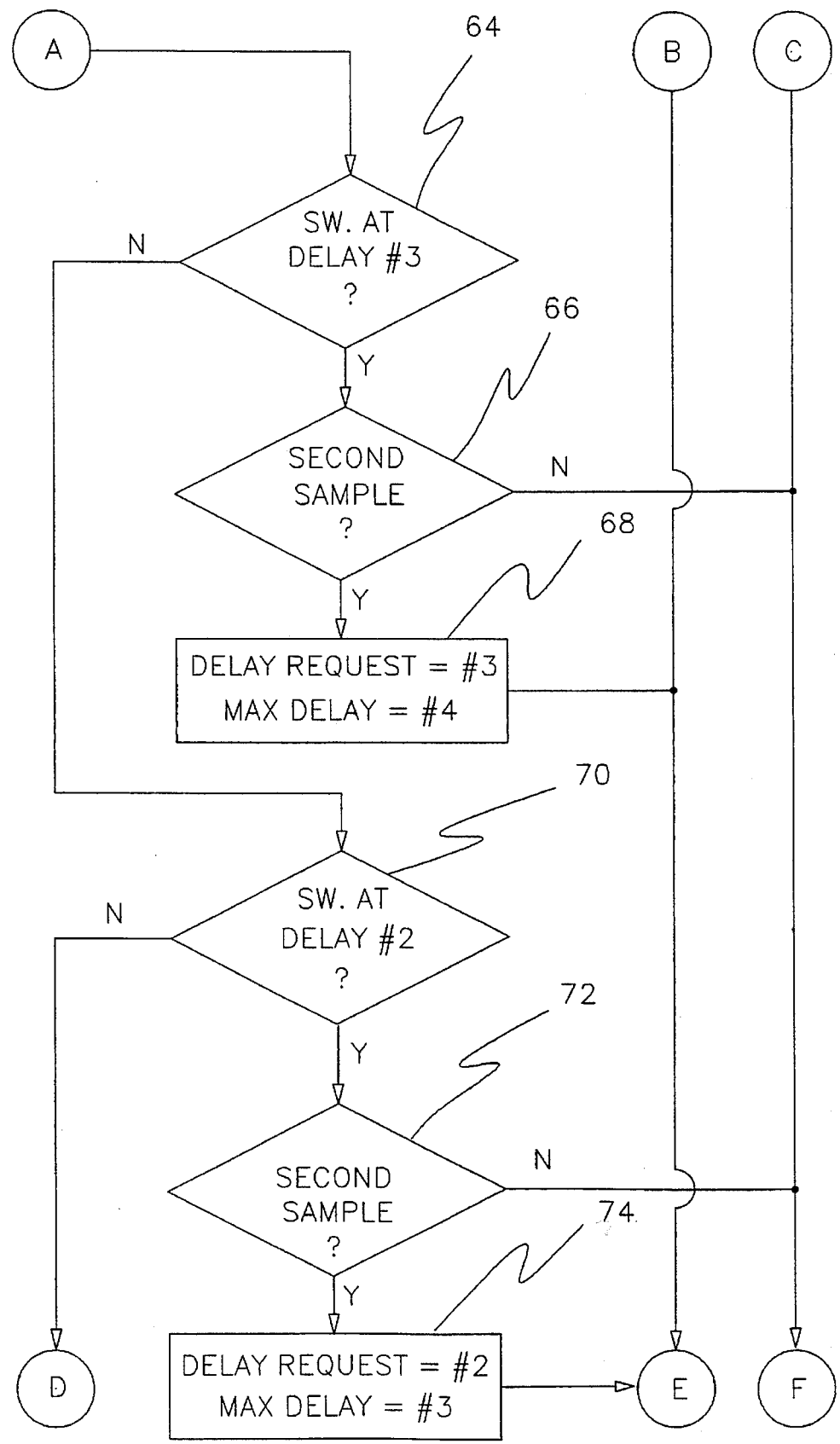
Figure 2C:
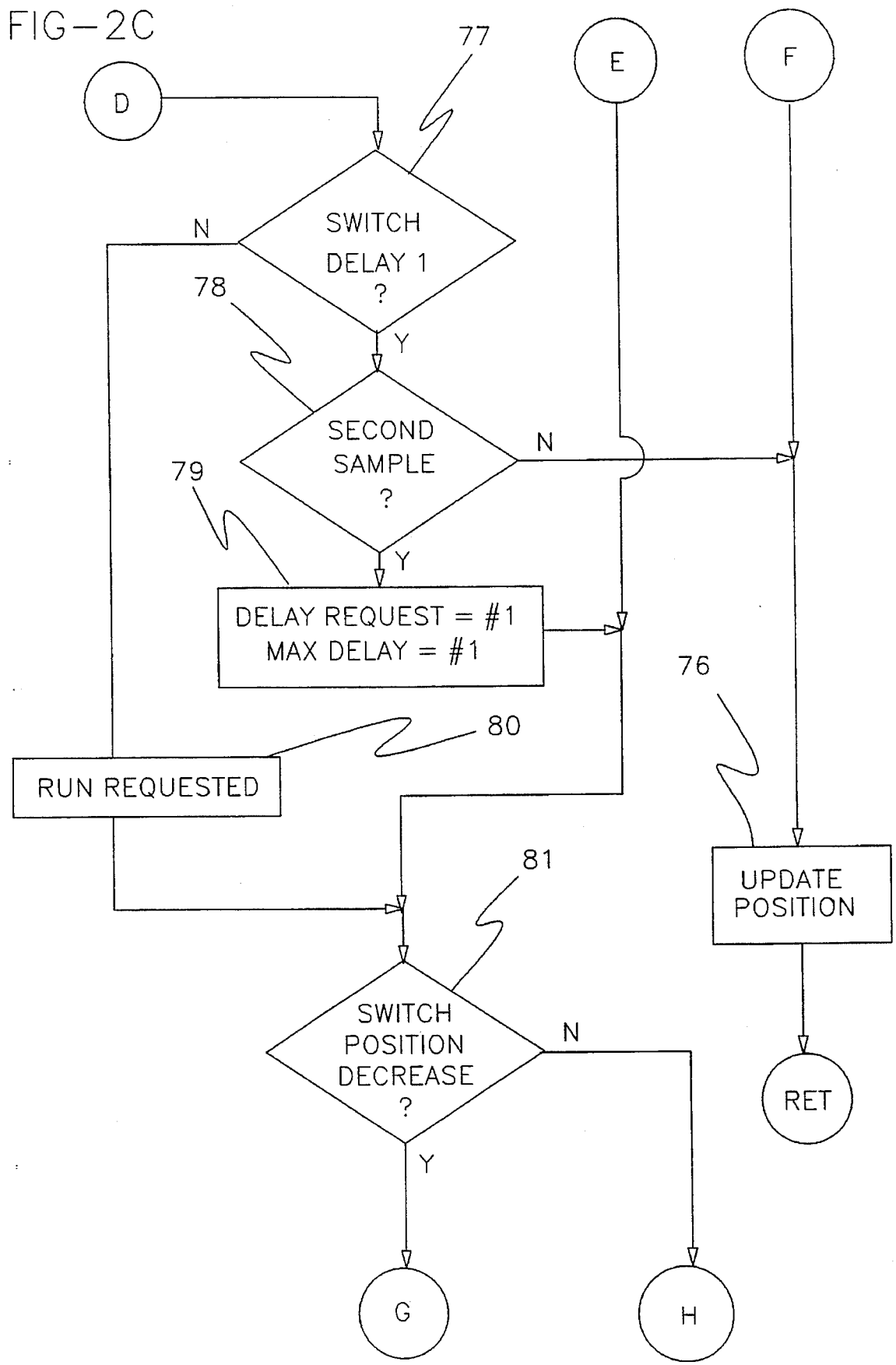
Figure 2D:
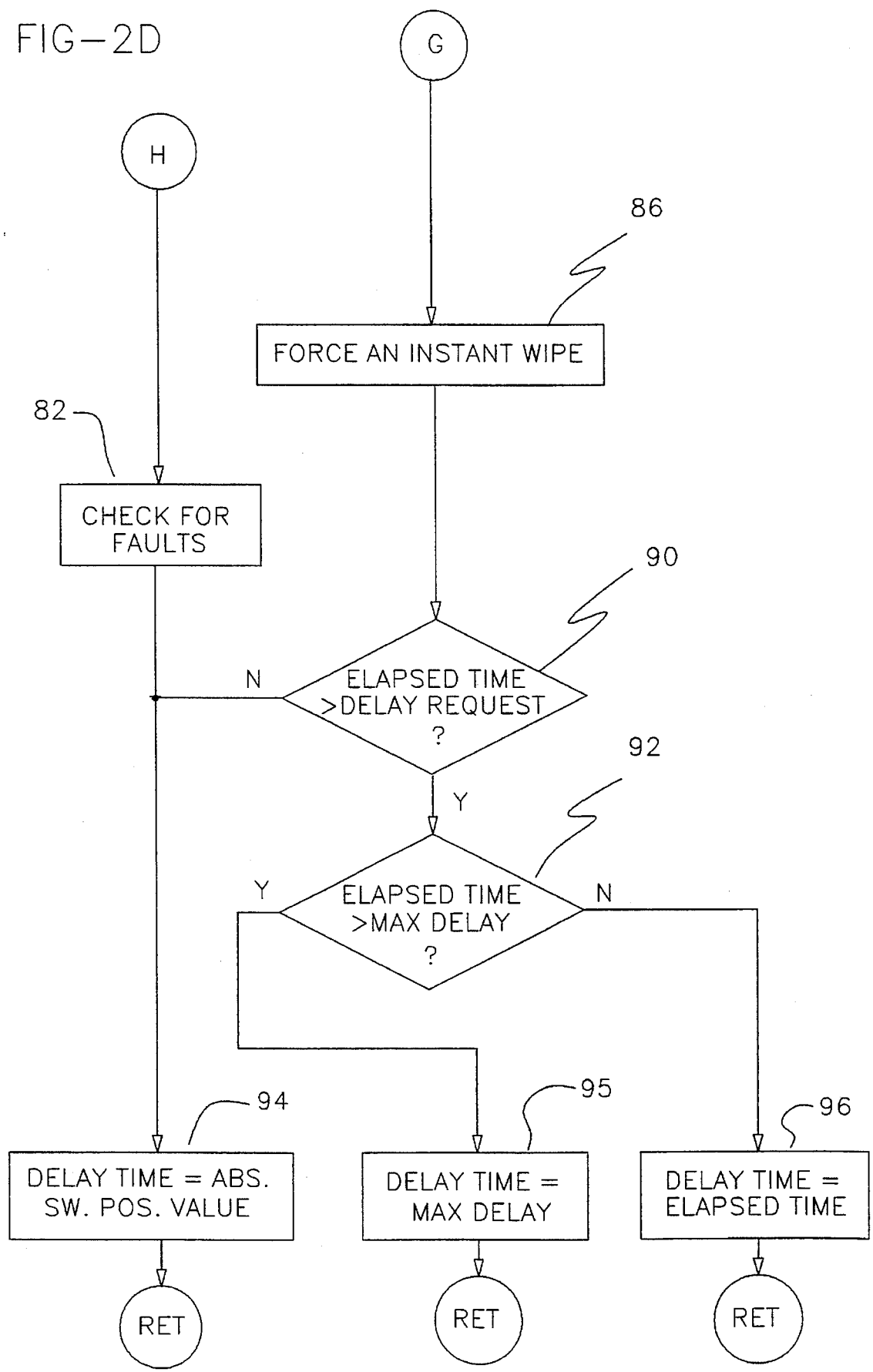

If switch 28 is found to be at position #5 for the first time, then processor 36 exits from the subroutine by passing through connection symbols C and F on FIGS. 2A, 2B and 2C. Prior to return to the main routine processor 36 updates its record of the switch position, as indicated at block 76 of FIG. 2C.

If switch 28 is found to be at position #5 for a second time, then processor 36 proceeds to block 56 where it records a Delay Request for delay #5 (i.e. a dwell period of 20 sec.). A Max Delay is set at that same amount.

If switch 28 is not set at position #5, then processor 36 proceeds to branch point 58 where it determines whether switch 28 is set at position #4. If so, then a check for a second occurrence thereof is performed at branch point 60. A second occurrence of switch position #4 causes an entry into block 62 where a Delay Request is recorded for Delay #4. This may be interpreted as a request for a dwell period in the order of about 8 sec. However the previous Max Delay (20 sec.) is retained, so a 12 sec. delay window is established.

If switch 28 is not set at either of positions #5 or #4, then positions #3, #2 and #1 are similarly checked at branch points 64, 70 and 77, and second occurrence checks are made at branch points 66, 72 and 78, respectively. For a second occurrence of switch position #3, the Max Delay is set at #4, and the Delay Request is reduced to #3 (block 68). This may result in a requested dwell period of 4 sec. and a 4 sec. window extending to a maximum period of 8 sec.

Second occurrences of switch positions #2 or #1 cause entries into blocks 74 or 79 where the Delay Request is set at #2 or #1, and the Max Delay is set at #3 or #1. The requested dwell periods corresponding to switch positions #2 and #1 may be about 2 sec. and 1 sec. respectively. Switch position #2 therefore establishes a 2 sec. dwell period window. There is no window for switch position #1.

If switch 28 is found to be set at any one of positions #1–#5, processor 36 either performs an update and a return, or alternatively, sets a dwell period window of appropriate size and proceeds to branch point 81 of FIG. 2C. In the event that processor determines that the switch is not set at any one of positions #1–#5 and that switch 26 is not set at OFF, then the wiper motor is directed to run at the default speed (block 80).

At branch point 81 processor 36 checks to determine whether the position of switch 28 has decreased. If so, then an instant wipe is commanded (block 86), and the processor proceeds to branch points 90, 92 to determine whether the elapsed time shown in elapsed time counter 38 is greater than the Delay Request and less than the Max Delay (i.e. within the established dwell period window). If so, then the count in elapsed time counter 38 is used as the new start count for delay counter 40 (block 96), thereby establishing the elapsed time as the new dwell period.

If the elapsed time is less than the lower limit of the established window, then processor 36 proceeds to block 94 where a new dwell period is established absolutely in accordance with the setting of switch 28. This is accomplished by setting the start count for delay counter 40 equal to a preprogrammed value corresponding to that particular setting of switch 28. The same action is taken if a switch position increase is detected at branch point 81. In such a case the processor also passes through block 82 where it checks for faults.

If the elapsed time is greater than the upper limit of the established window, then processor 36 proceeds to block 95 and sets the start count for counter 40 equal to the value of Max Delay. That sets the upper limit of the window as the dwell period. After the start count for counter 40 has been set in one of blocks 94–96, the processor returns to the main routine.

It will be understood that switch 28 may have more or less than five setting positions and that the delay windows associated with those positions may be of any desired duration. Also, processor 36 could be programmed in a different manner than has been described or could have its microprocessor replaced by another equivalent device, such as, for instance, a digital logic arrangement or an analog computer.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A method of setting a dwell period for an intermittent windshield wiper comprising the steps of:

(1) actuating said windshield wiper to complete a wiping stroke;

(2) positioning a switch to select a maximum delay and a delay request;

(3) generating a time lapse signal following said wiping stroke;

(4) processing said time lapse signal to determine an elapsed time between said wiping stroke and said positioning of said switch;

(5) setting said dwell period at a duration equal to said elapsed time when said elapsed time is in a range between said maximum delay and said delay request; and (6) setting said dwell period at a duration equal to said maximum delay when said elapsed time is above said range.

2. A method according to claim 1 further comprising the step of setting said dwell period at a duration equal to said delay request when said elapsed time is below said range.

3. A method of setting a dwell period for an intermittent windshield wiper comprising the steps of:

(1) actuating said windshield wiper to complete a wiping stroke;

(2) positioning a switch to select a maximum delay and a delay request;

(3) generating a time lapse signal following said wiping stroke;

(4) processing said time lapse signal to determine an elapsed time between said wiping stroke and said positioning of said switch;

(5) determining a direction of movement for said switch during said positioning step;

(6) setting said dwell period at a duration equal to said elapsed time when said elapsed time is in a range between said maximum delay and said delay request and said direction is a decreasing direction; and (7) setting said dwell period at a duration equal to said delay request when said direction is an increasing direction.

4. A method according to claim 3 further comprising the step of setting said dwell period at a duration equal to said maximum delay when said elapsed time is above said range and said direction is a decreasing direction.

* * * * *